US011473951B2

(12) United States Patent
Hase et al.

(10) Patent No.: US 11,473,951 B2
(45) Date of Patent: Oct. 18, 2022

(54) FLOW DIRECTION SENSOR

(71) Applicant: TSI Incorporated, Shoreview, MN (US)

(72) Inventors: Anthony Hase, White Bear Township, MN (US); Jeremy Ames, Minneapolis, MN (US); David Castagnetta, Maple Grove, MN (US)

(73) Assignee: TSI Incorporated, Shoreview, MN (US)

( * ) Notice: Subject to any disclaimer, the term of this patent is extended or adjusted under 35 U.S.C. 154(b) by 258 days.

(21) Appl. No.: 16/653,331

(22) Filed: Oct. 15, 2019

(65) Prior Publication Data

US 2020/0116534 A1    Apr. 16, 2020

Related U.S. Application Data

(60) Provisional application No. 62/847,773, filed on May 14, 2019, provisional application No. 62/745,954, filed on Oct. 15, 2018.

(51) Int. Cl.
*G01F 1/68*    (2006.01)
*G01F 1/684*   (2006.01)
*F15D 1/02*    (2006.01)
*G01F 1/075*   (2006.01)
(Continued)

(52) U.S. Cl.
CPC .............. *G01F 1/684* (2013.01); *F15D 1/02* (2013.01); *G01F 1/075* (2013.01); *G01F 1/11* (2013.01); *G01F 1/3273* (2022.01)

(58) Field of Classification Search
None
See application file for complete search history.

(56) References Cited

U.S. PATENT DOCUMENTS 5,392,646 A * 2/1995 Yajima ................... G01F 1/692
73/204.19
5,925,831 A * 7/1999 Storsved ................... G01F 1/42
73/861.52
(Continued)

FOREIGN PATENT DOCUMENTS

WO    2017122090 A1    7/2017

OTHER PUBLICATIONS

Patent Cooperation Treaty, International Searching Authority, Search Report and Written Opinion for PCT/US2019/056296, 18 pages, dated Mar. 11, 2020.

*Primary Examiner* — Harshad R Patel
(74) *Attorney, Agent, or Firm* — Viksnins Harris Padys Malen LLP

(57) ABSTRACT

An apparatus and method for use in determining one or more fluid flow properties of a fluid in a conduit is disclosed. The apparatus includes a substrate including a barrier, a first flow sensor coupled to the substrate and a second flow sensor coupled to the substrate. The first flow sensor is located at a first sensor distance from a first barrier surface, and the second flow sensor is located a second sensor distance from the second barrier surface. The first sensor distance is substantially equal to the second sensor distance. In operation, the first flow sensor produces a first sensor signal, and the second flow sensor produces a second sensor signal. The direction of flow for the fluid is determined by comparing the first sensor signal to the second sensor signal.

15 Claims, 10 Drawing Sheets

(51) Int. Cl.
    *G01F 1/11*     (2006.01)
    *G01F 1/325*    (2022.01)

(56) References Cited

U.S. PATENT DOCUMENTS

| | | | | |
|---|---|---|---|---|
| 7,478,556 | B2* | 1/2009 | Ruffino | G01K 7/42 |
| | | | | 374/E13.006 |
| 9,597,476 | B1* | 3/2017 | Inoue | G01F 1/44 |
| 2001/0039833 | A1* | 11/2001 | Engel | A61B 5/0878 |
| | | | | 73/204.27 |
| 2004/0237645 | A1* | 12/2004 | Naguib | G01F 1/696 |
| | | | | 73/204.27 |
| 2008/0258353 | A1* | 10/2008 | Hutchinson | B29C 45/162 |
| | | | | 264/483 |
| 2009/0250059 | A1* | 10/2009 | Allum | A61M 16/0816 |
| | | | | 128/204.26 |
| 2011/0048564 | A1 | 3/2011 | Wible et al. | |
| 2011/0308312 | A1* | 12/2011 | Moro | G01P 5/10 |
| | | | | 73/204.27 |
| 2014/0326064 | A1 | 11/2014 | Nakano et al. | |
| 2015/0192442 | A1 | 7/2015 | Olin | |
| 2015/0308873 | A1* | 10/2015 | Wang | G01F 1/69 |
| | | | | 73/204.27 |
| 2015/0309067 | A1* | 10/2015 | Qian | G01P 5/12 |
| | | | | 73/204.27 |
| 2016/0136368 | A1* | 5/2016 | Spandorfer | A61M 16/14 |
| | | | | 128/201.13 |

* cited by examiner

```
                    ┌─────────┐
                    │  BEGIN  │
                    └────┬────┘
                         │
┌────────────────────────┴────────────────────────────┐
│ FORM A SUBSTRATE INCLUDING A BARRIER HAVING A       │
│ FIRST BARRIER SURFACE, A SECOND BARRIER SURFACE,    │
│ AND A BARRIER EDGE SURFACE INCLUDING A CURVED       │
│ SURFACE, THE FIRST BARRIER SURFACE SUBSTANTIALLY    │
│ PARALLEL TO THE SECOND BARRIER SURFACE.             │
└────────────────────────┬────────────────────────────┘  — 402
                         │
┌────────────────────────┴────────────────────────────┐
│ LOCATE A FIRST SENSOR AND A SECOND SENSOR           │
│ SUBSTANTIALLY SYMMETRICALLY WITH RESPECT TO THE     │
│ FIRST BARRIER SURFACE AND THE SECOND BARRIER        │
│ SURFACE, THE FIRST SENSOR INCLUDING A PAIR OF FIRST │
│ SENSOR CONDUCTIVE PINS AND THE SECOD SENSOR         │
│ INCLUDING A PAIR OF SECOND SENSOR CONDUCTIVE        │
│ PINS.                                               │
└────────────────────────┬────────────────────────────┘  — 404
                         │
┌────────────────────────┴────────────────────────────┐
│ EMBED THE PAIR OF FIRST SENSOR CONDUCTIVE PINS      │
│ AND THE PAIR OF SECOND SENSOR CONDUCTIVE PINS IN    │
│ THE SUBSTRATE.                                      │
└────────────────────────┬────────────────────────────┘  — 406
                         │
                    ┌────┴────┐
                    │   END   │
                    └─────────┘
```

FLOW DIRECTION SENSOR

CROSS-REFERENCE TO RELATED APPLICATIONS

This patent application claims priority under 35 U.S.C. § 119 to U.S. Provisional Application No. 62/745,954, filed on Oct. 15, 2018, and U.S. Provisional Application No. 62/847,773, filed on May 14, 2019. The disclosures of the above referenced applications are expressly incorporated herein by reference in their entireties.

BACKGROUND

Determining the direction of flow in a fluid confined to a conduit is important for some gas flow monitoring applications. For example, a single flow sensor in a ventilator application will be exposed to gas flow in and out of the machine. Unfortunately, gas flow meters based on detecting the velocity of gas through an area of known volume cannot detect the flow direction. Some microelectromechanical system (MEMs) flow sensors can detect flow direction, but MEMs flow sensors have the disadvantage of a slow response time. For these and other reasons, there is a need for the subject matter of the present disclosure.

SUMMARY

Consistent with the disclosed embodiments, an apparatus for use in determining one or more fluid properties of a fluid flowing in a conduit is disclosed. The apparatus comprises a substrate including a barrier having a first barrier surface and a second barrier surface. The apparatus further comprises a first flow sensor to generate a first velocity sensor signal, the first flow sensor located at a first sensor distance from the first barrier surface. And the apparatus further comprises a second flow sensor to generate a second velocity sensor signal, the second flow sensor located at a second sensor distance from the second barrier surface, wherein the first sensor distance and the second sensor distance are selected to disturb the fluid flowing in the conduit in such a way as to enable determination of the one or more fluid flow properties from the first velocity sensor signal and the second velocity sensor signal. In some embodiments, the apparatus further comprises a third sensor including a pair of third sensor conductive pins, the pair of third sensor conductive pins embedded in the barrier and the substrate.

Consistent with the disclosed embodiments, a method for determining one or more fluid flow properties of a fluid flowing in a conduit is disclosed. The method comprises providing a barrier, the barrier having a first barrier surface and a second barrier surface, in the fluid to cause a difference between upstream characteristics and downstream characteristics of the fluid flowing in the conduit. The method comprises locating a first flow sensor a first distance from the first barrier surface, the first flow sensor to generate a first sensor signal. The method comprises locating a second flow sensor a second distance from the second barrier surface, the second flow sensor to generate a second sensor signal. And the method comprises processing the first sensor signal and the second sensor signal to determine the one or more fluid flow properties of the fluid flowing in the conduit. In some embodiments, the method further comprises responding to the step function change in the fluid flow direction by generating a third sensor signal from a third sensor located in the fluid, the third sensor signal having a third sensor signal rise time of between about three milliseconds and about five milliseconds and the third sensor signal to provide a fluid flow magnitude signal. In some embodiments, the method further comprises recording a sequential plurality of fluid flow sensor readings and a next fluid flow sensor reading following the sequential plurality of fluid flow sensor readings from the first flow sensor signal. The method further comprises generating a curve from a least squares fit to the sequential plurality of fluid flow sensor readings, generating a predicted next data point from the curve, comparing the next fluid flow sensor reading to the predicted next data point and generating a difference between the next fluid flow sensor reading and the predicted next data point, and invalidating the next fluid flow sensor reading, if the difference is substantially greater than zero.

Consistent with the enclosed embodiments, an apparatus for determining one or more fluid flow properties including velocity, magnitude and direction in a conduit. The apparatus comprises a barrier having a first barrier surface and a second barrier surface. The apparatus further comprises a first sensor located at a first sensor distance from the first barrier surface. And the apparatus further comprises a second sensor located at a second sensor distance from the second barrier surface, the second sensor distance substantially equal to the first sensor distance. The apparatus further comprises an electronic system electrically coupled to the first sensor and the second sensor, the electronic system to provide a signal indicative of at least one of one or more fluid flow properties.

Consistent with the disclosed embodiments, an apparatus for use in determining one or more fluid flow properties of a fluid in a conduit is disclosed. The apparatus comprises a substrate including a barrier having a first barrier surface and a second barrier surface. The apparatus further comprises a first sensor coupled to the substrate, the first sensor located at a first sensor distance from the first barrier surface. The apparatus further comprises a second sensor coupled to the substrate, the second sensor located at a second sensor distance from the second barrier surface, the second sensor distance substantially equal to the first sensor distance and the first barrier surface substantially parallel to the second barrier surface. The apparatus further comprises a third sensor including a pair of third sensor conductive pins, the pair of third sensor conductive pins embedded in the barrier and the substrate. The term "conductive pins" includes leads and other electrically conductive structures. The apparatus further comprises a Wheatstone bridge coupled to the first sensor to generate a first sensor fluid flow signal. The signal can be further processed by analog and digital circuits.

Consistent with some other embodiments, a method for making an apparatus to determine a flow direction in a fluid is disclosed The method comprises forming a substrate including a barrier having a first barrier surface, a second barrier surface, and a barrier edge surface including a curved surface, the first barrier surface substantially parallel to the second barrier surface. The method comprises locating a first sensor and a second sensor substantially symmetrically with respect to the first barrier surface and the second barrier surface, the first sensor including a pair of first sensor conductive pins and the second sensor including a pair of second sensor conductive pins. The method further comprises embedding the pair of first sensor conductive pins and the pair of second sensor conductive pins in the substrate. The method further comprises aligning a third sensor substantially parallel to the first sensor and the second sensor, the third sensor including a pair of third sensor conductive pins. The method further comprises embedding the pair of third sensor conductive pins in the substrate and the barrier.

Consistent with some other embodiments, a method for determining one or more fluid flow properties of a fluid in a conduit is disclosed. The method comprises responding to a change in a fluid flow direction by generating a first sensor signal having a first sensor signal from a first sensor located in the fluid. The method further comprises responding to the change in the fluid flow direction by generating a second sensor signal having a second sensor signal from a second sensor located in the fluid. The method further comprises comparing the first sensor signal to the second sensor signal to determine the flow direction. The method further comprises responding to the change in the fluid flow direction by generating a third sensor signal from a third sensor located in the fluid, the third sensor signal having a third sensor signal rise time of between about three milliseconds and about five milliseconds and the third sensor signal to provide a fluid flow magnitude signal.

Consistent with some embodiments, a system to monitor a fluid flow direction in a fluid that flows between a patient and a ventilator is disclosed. The system comprises a fluid flow direction sensor including a barrier, the fluid flow direction sensor to detect the fluid flow direction in the fluid. The system further comprises a conduit coupled to the fluid flow direction sensor, the conduit to couple to the patient and the ventilator. The system further comprises a control system to couple to the fluid flow direction sensor to monitor the fluid flow direction.

It is to be understood that both the foregoing general description and the following detailed description are exemplary and explanatory only and are not restrictive of the invention, as claimed.

The accompanying drawings, which are incorporated in and constitute a part of this specification, illustrate embodiments of the invention and together with the description, serve to explain the principles of the invention.

BRIEF DESCRIPTION OF THE DRAWINGS

FIG. 4 shows a flow diagram of a method for making an apparatus to determine a flow direction in a fluid in accordance with some embodiments of the present disclosure;

DESCRIPTION

Reference will now be made in detail to the exemplary embodiments of the present disclosure described below and illustrated in the accompanying drawings. Wherever possible, the same reference numbers will be used throughout to refer to same or like parts.

While the present invention is described herein with reference to illustrative embodiments for particular applications, it should be understood that the invention is not limited thereto. Those having ordinary skill in the art and access to the teachings provided herein will recognize additional modifications, applications, embodiments, and substitution of equivalents, that all fall within the scope of the disclosure. Accordingly, the disclosure is not to be considered as limited by the foregoing or following descriptions.

Figure 1:
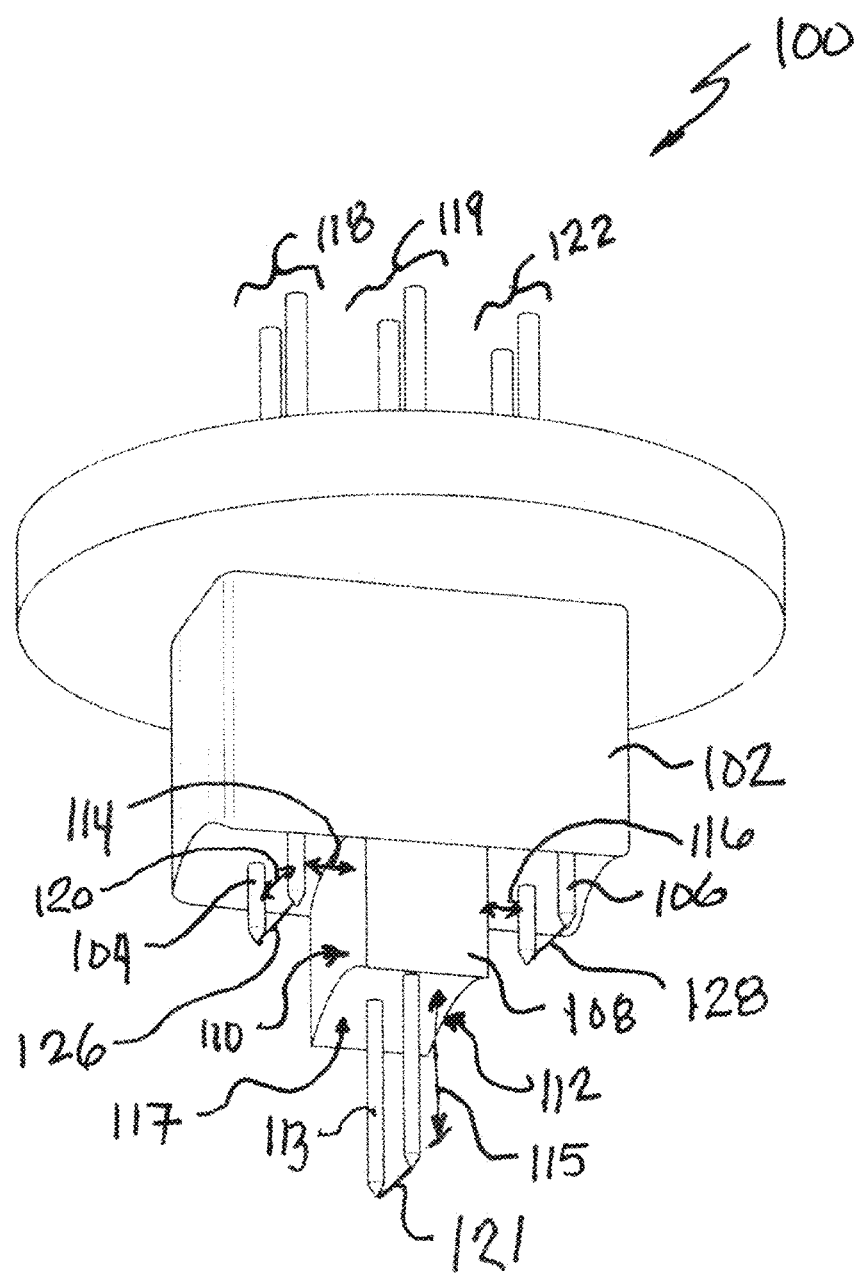
FIG. 1 shows an illustration of an apparatus for use in determining one or more fluid flow properties of a fluid in a conduit in accordance with some embodiments of the present disclosure.

FIG. 1 shows an illustration of an apparatus 100 for use in determining one or more fluid flow properties of a fluid in a conduit in accordance with some embodiments of the present disclosure. Exemplary fluids include gases and liquids. The apparatus 100 includes a substrate 102, a first sensor 104 coupled to the substrate 102, and a second sensor 106 coupled to the substrate 102. The substrate 102 includes a barrier 108 having a first barrier surface 110 and a second barrier surface 112. The first sensor 104 is located at a first sensor distance 114 from the first barrier surface 110. The second sensor 106 is located at a second sensor distance 116 from the second barrier surface 112. In some embodiments, the first sensor distance 114 is substantially equal to the second sensor distance 116 and the first barrier surface 110 is substantially parallel to the second barrier surface 112. In some embodiments, a third sensor 113 is coupled to the substrate 102. In some embodiments the first sensor 104 and the second sensor 106 are fluid flow sensors.

In some embodiments, the apparatus 100 for use in determining one or more fluid properties of a fluid flowing in a conduit includes the substrate 102 including the barrier 108 having the first barrier surface 110 and the second barrier surface 112, a first sensor 104, such as a velocity sensor, flow sensor, or other sensor to detect other fluid properties, to generate a first velocity sensor signal, the first sensor located at a first sensor distance 114 from the first barrier surface 110, and the second sensor 106, such as a velocity sensor, flow sensor, or other sensor to detect other fluid properties, to generate a second velocity sensor signal, the second sensor 106 located at a second sensor distance 116 from the second barrier surface 112, wherein the first sensor distance 114 and the second sensor distance 116 are selected to disturb the fluid flowing in the conduit in such a way as to enable determination of the one or more fluid flow properties from the first velocity sensor signal and the second velocity sensor signal.

Figure 2:
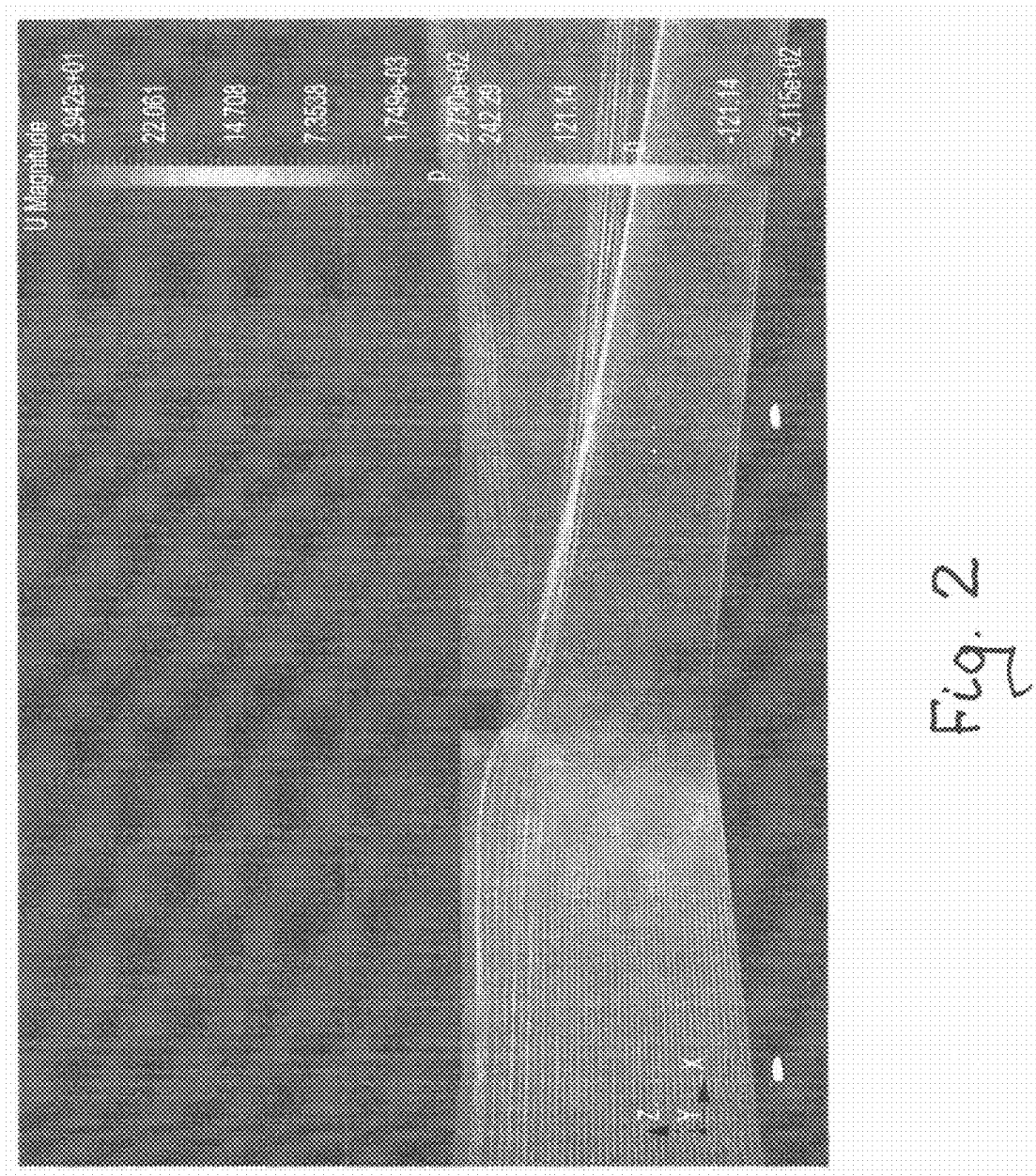
FIG. 2 shows a flow profile from a computational fluid dynamics model for a barrier inserted into a fluid flowing from left to right in a conduit in accordance with some embodiments of the present disclosure.

FIG. 2 shows a flow profile for a computational fluid dynamics model for a barrier inserted into a fluid flowing from left to right in a conduit in accordance with some embodiments of the present disclosure. As can be seen by comparing the flow lines at the barrier, the flow velocity to the left of the barrier (upstream) is greater than the flow velocity to the right of the barrier (downstream). The streamlines in the "shadow" of the barrier form a vortex. The upstream streamlines to the left of the barrier when compared to the downstream streamlines to the right of the barrier indicate that the flow velocity is greater to the left of the barrier than the flow velocity to the right of the barrier.

Referring again to FIG. 1, in operation, the apparatus 100 is coupled to a conduit such that the first sensor 104, the second sensor 106, and the third sensor 113 are in contact with a fluid. As the fluid flows in a direction from the first sensor 104 to the second sensor 106, the fluid encounters the first sensor 104, the barrier 108, and the second sensor 106. The barrier 108 casts a "shadow" on the second sensor 106. Referring to FIG. 2, and as shown in FIG. 2, the flow rate at the first sensor 104 (upstream from the barrier) is greater than the flow rate at the second sensor 106 (downstream from the barrier). Thus, at a particular point in time the first sensor 104 generates a first sensor signal, the second sensor 106 generates a second sensor signal, and because the flow rate is greater at the first sensor 104 than at the second sensor 106 the first sensor signal is greater than the second sensor signal. Hence, the direction of flow of the fluid can be determined. The third sensor 113 generates a signal indicative of the flow rate or flow magnitude at the third sensor 113. In some embodiments, the third sensor 113 in combination with either the first sensor 104 or the second sensor 106 is used to detect the direction of flow of the fluid. The apparatus 100 has a dynamic range of from about 0.05 liters per minute up to about 300 liters per minute.

The substrate 102 provides a base for mounting the first sensor 104, the second sensor 106, and the third sensor 113. The first sensor 104 includes a pair of first sensor conductive pins 118. In some embodiments, the pair of first sensor conductive pins 118 includes a distance 120 between the pair of first sensor conductive pins 118 of between about 0.07 inches and 0.12 inches. The second sensor 106 includes a pair of second sensor conductive pins 122. The third sensor 113 includes a pair of third sensor conductive pins 119. As shown in FIG. 1, the pair of first sensor conductive pins 118 is coupled to a first sensor element 126 and embedded in the substrate 102. The pair of first sensor conductive pins 118 extend through the substrate 102 and are available for electrical connection. Also, as shown in FIG. 1, the pair of second sensor conductive pins 122 is coupled to a second sensor element 128 and embedded in the substrate 102. The pair of second sensor conductive pins 122 extend through the substrate 102 and are available for electrical connection. Also, as shown in FIG. 1, the pair of third sensor conductive pins 119 is coupled to a third sensor element 121 and embedded in the substrate 102 and the barrier 108. The pair of third sensor conductive pins 119 extend through the substrate 102 and are available for electrical connection.

The substrate 102 also includes the barrier 108. The barrier 108 includes the first barrier surface 110 and the second barrier surface 112. In some embodiments, the first barrier surface 110 is substantially parallel to the second barrier surface 112. In some embodiments, the first sensor 104 and the second sensor 106 are located substantially symmetrically with respect to the first barrier surface 110 and the second barrier surface 112. The first sensor 104 and the second sensor 106 are located substantially symmetrically with respect to the first barrier surface 110 and the second barrier surface 112 when the distance between the first sensor 104 and the second barrier surface 112 and the distance between the second sensor 106 and the first barrier surface 110 are substantially equal.

In some embodiments, the substrate 102 and the barrier 108 are formed by molding a non-conductive moldable plastic, such as a polycarbonate, to form a unitary structure including the first sensor 104, the second sensor 106, and the third sensor 113. The pair of first sensor conductive pins 118, the pair of second sensor conductive pins 122, and the pair of third sensor conductive pins 119 are also embedded in the substrate 102. The molding process enables fabrication of the apparatus 100 with tight tolerances on the positioning of the first sensor 104 with respect to the first barrier surface 110, the second sensor 106 with respect to the second barrier surface 112, and the third sensor 113 with respect to a barrier edge surface 117, which in some embodiments includes a curved surface. The molding process also enables the fabrication of the apparatus 100 with the first barrier surface 110 substantially parallel to the second barrier surface 112.

The first sensor 104 is located at the first sensor distance 114 from the first barrier surface 110. In some embodiments, the first sensor distance 114 is between about 0.020 inches and about 0.100 inches. In some embodiments, the first sensor distance 114 is between about 0.030 inches and about 0.050 inches. In some embodiments the first sensor distance is between about 0.035 inches and about 0.045 inches. In some embodiments, the first sensor distance 114 is about 0.040 inches. In some embodiments, the first sensor 104 and the second sensor 106 are each located in a vortex created by the barrier 108.

The second sensor 106 is located at the second sensor distance 116 from the second barrier surface 112. In some embodiments, the second sensor distance 116 is between about 0.020 inches and about 0.100 inches. In some embodiments, the second sensor distance 116 is between about 0.030 inches and about 0.050 inches. In some embodiments, the second sensor distance 116 is between about 0.035 inches and about 0.045 inches. In some embodiments, the second sensor distance 116 is about 0.040 inches.

The first sensor distance 114 and the second sensor distance 116, in some embodiments, are selected to maximize the difference between the first sensor signal generated at the first sensor 104 and the second sensor signal generated at the second sensor 106 in response to a step function change in fluid flow direction.

The third sensor 113 is located at a third sensor distance 115 from the barrier edge surface 117. In some embodiments, the third sensor distance 115 is up to about 0.180 inches. In some embodiments, the third sensor distance 115 is about 0.180 inches.

The first sensor 104, the second sensor 106, and the third sensor 113 are fluid flow sensors. A fluid flow sensor is capable of detecting the magnitude of a fluid flow. The first sensor 104, the second sensor 106, and the third sensor 113 are not limited to a particular type of fluid flow sensor. Fast response, high sensitivity, and wide dynamic range are desirable characteristics in a fluid flow sensor. A wide dynamic range enhances the measurable flow resolution and is particularly useful in low flow applications. A small form factor is also desirable, particularly in respiratory applications.

In some embodiments, the first sensor 104, the second sensor 106, and the third sensor 113 are thermal dispersion flow sensors. A thermal dispersion flow sensor works by placing a heated sensor inside a flow tube and electronically measuring the amount of heat removed from the sensor by a flowing fluid. At low flow rates the heat removed from the sensor is low. At higher flow rates the heat removed from the sensor is higher.

Figure 3A:
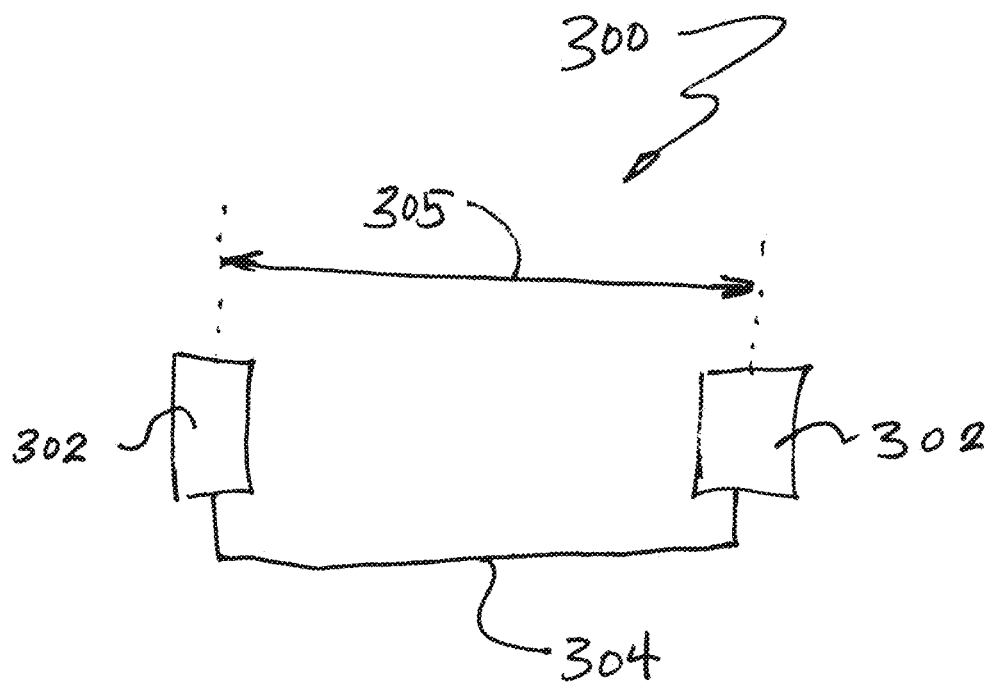
FIG. 3A shows an illustration of a thin-film flow sensor in accordance with some embodiments of the present disclosure.

FIG. 3A shows an illustration of a thin-film flow sensor 300 in accordance with some embodiments of the present disclosure. In some embodiments, the first sensor 104, the second sensor 106, and the third sensor 113 (all shown in FIG. 1) are thin-film flow sensors. The thin-film flow sensor 300 includes a pair of conductive pins 302 coupled to a thin-film sensor element 304. The pair of conductive pins 302 is electrically coupled to the thin-film sensor element 304. Exemplary materials suitable for use in the fabrication of the pair of conductive pins 302 include phosphor bronze and gold. In some embodiments, the pair of conductive pins 302 include a phosphor bronze base with gold plating. The pair of conductive pins 302 include a pin spacing 305. In some embodiments, the pin spacing 305 is between about 0.070 inches and about 0.120 inches. In some embodiments, the pin spacing is about 0.070 inches.

Figure 3B:
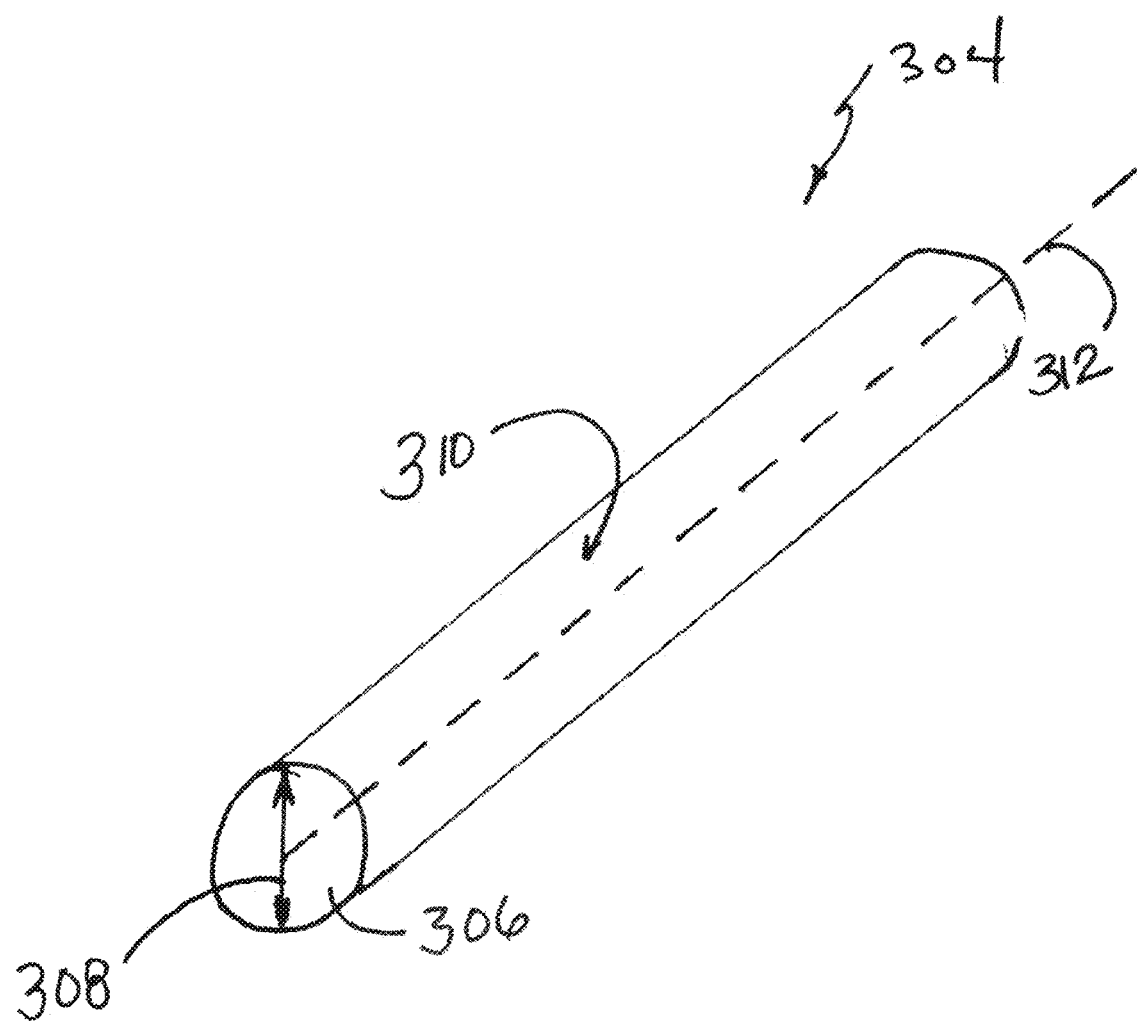
FIG. 3B shows an illustration of the thin-film sensor element, shown in FIG. 3A, in accordance with some embodiments of the present disclosure.

FIG. 3B shows an illustration of the thin-film sensor element 304, shown in FIG. 3, in accordance with some embodiments of the present disclosure. The thin-film sensor element 304 includes a non-conductive substrate 306. Exemplary materials suitable for use in connection with the fabrication of the non-conductive substrate 306 include glasses, glass-polymers, and polymers. The non-conductive substrate 306 is not limited to having a particular shape. Cylinders, cylindrical fibers, and square fibers are exemplary shapes suitable for use in the fabrication of the non-conductive substrate 306. In some embodiments, the non-conductive substrate 306 is substantially cylindrical having a diameter 308, a metallic coating 310, and a cylindrical axis 312. The substantially cylindrical non-conductive substrate has straight parallel sides and a circular cross-section. In some embodiments, the diameter 308 is about 0.002 inches. In some embodiments, the metallic coating 310 includes a conductive metal such as gold, copper, or platinum. In some embodiments, the metallic coating 310 is platinum.

Figure 3C:
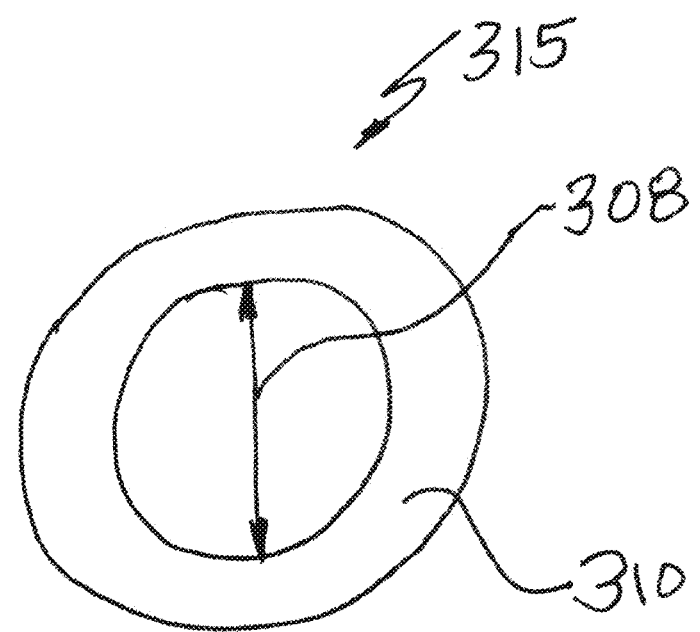
FIG. 3C shows an illustration of a cross-sectional view of the thin-film sensor element, shown in FIG. 3A and FIG. 3B, in accordance with some embodiments of the present disclosure.

FIG. 3C shows an illustration of a cross-sectional view 315 of the thin-film sensor element 304, shown in FIG. 3A and FIG. 3B, in accordance with some embodiments of the present disclosure. In some embodiments, the thin film sensor element 304 is a platinum coated glass filament. The cross-sectional view 315 shows the diameter 308 and the metallic coating 310. In some embodiments, the diameter 308 is between about 0.001 and about 0.010 inches. In some embodiments, the diameter 308 is between about 0.001 and about 0.005 inches. In some embodiments, the diameter 308 is between about 0.001 and about 0.003 inches. In some embodiments, the diameter 308 is about 0.002 inches.

FIG. 4 shows a flow diagram of a method 400 for making an apparatus to determine a flow direction in a fluid in accordance with some embodiments of the present disclosure. The method 400 includes forming a substrate including a barrier having a first barrier surface, a second barrier surface, and a barrier edge surface including a curved surface, the first barrier surface substantially parallel to the second barrier surface (block 402), locating a first sensor and a second sensor substantially symmetrically with respect to the first barrier surface and the second barrier surface, the first sensor including a pair of first sensor conductive pins and the second sensor including a pair of second sensor conductive pins (block 404), and embedding the pair first sensor conductive pins and the pair of second sensor conductive pins in the substrate (block 406). In some embodiments, the method 400 further includes aligning a third sensor substantially parallel to the first sensor and the second sensor, the third sensor including a pair of third sensor conductive pins, and embedding the pair of third sensor conductive pins in the substrate and the barrier. In some embodiments, in the method 400, forming the substrate includes molding the substrate from a non-conductive moldable plastic, such as a polycarbonate, to form a unitary structure.

Figure 5:
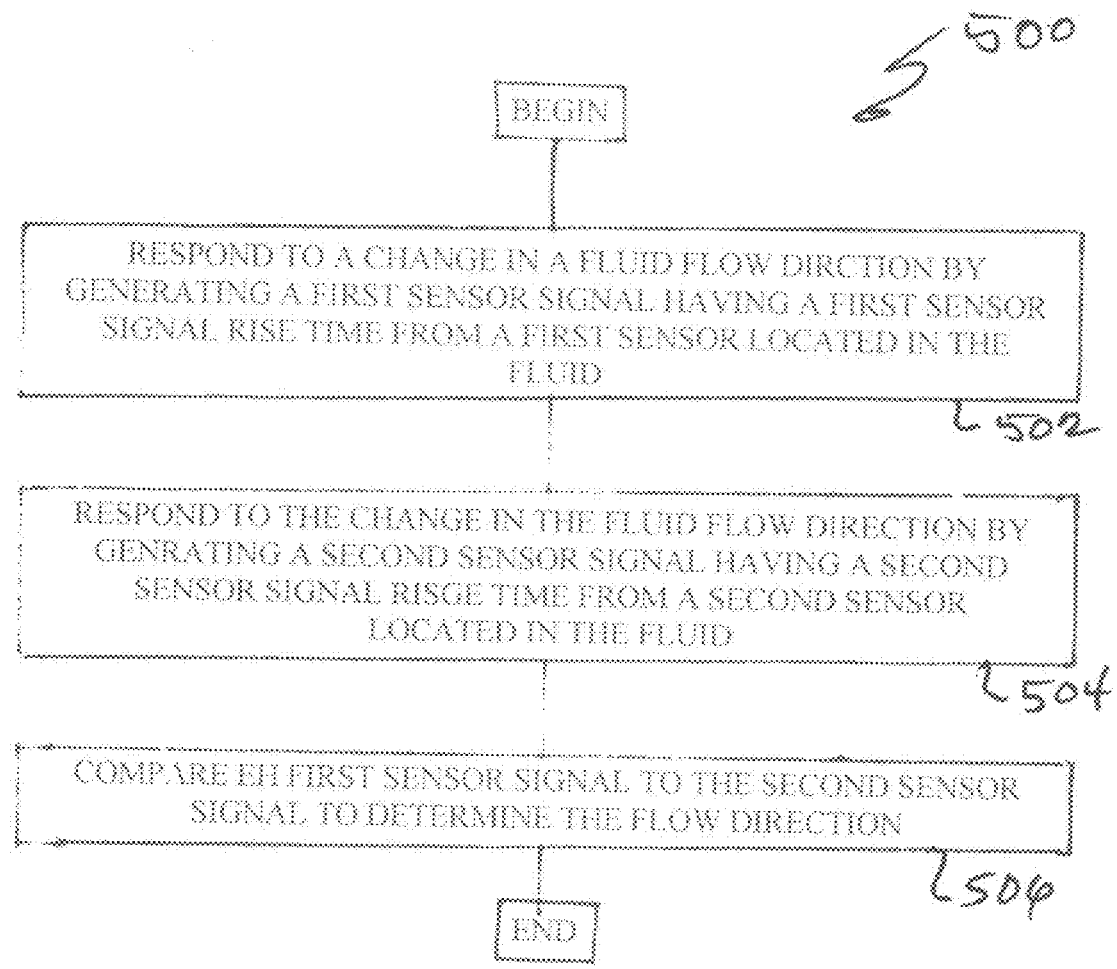
FIG. 5 shows a flow diagram of a method for determining one or more fluid flow properties of a fluid in a conduit in accordance with some embodiments of the present disclosure.

FIG. 5 shows a flow diagram of a method 500 for determining one or more fluid flow properties of a fluid in a conduit in accordance with some embodiments of the present disclosure. The method 500 includes responding to a change in a fluid flow direction by generating a first sensor signal from a first sensor located in the fluid (block 502), responding to the change in the fluid flow direction by generating a second sensor signal from a second sensor located in the fluid (block 504), and comparing the first sensor signal to the second sensor signal to determine the flow direction (block 506).

In some embodiments, responding to a step function change in a fluid flow direction by generating a first sensor signal from a first sensor located in the fluid and generating a second sensor signal from a second sensor located in the fluid includes generating the first sensor signal having a rise time of between about three milliseconds and about five milliseconds and generating the second sensor signal having a rise time of between about three milliseconds and about five milliseconds. In some embodiments, in the method 500, responding to a step function change in a fluid flow direction by generating a first sensor signal from a first sensor located in the fluid and generating a second sensor signal from a second sensor located in the fluid comprises generating the first sensor signal having a rise time of about four milliseconds and generating the second sensor signal having a rise time of about four milliseconds.

In some embodiments, the method 500 further includes responding to the step function change in the fluid flow direction by generating a third sensor signal from a third sensor located in the fluid, the third sensor signal having a third sensor signal rise time of between about three milliseconds and about five milliseconds and the third sensor signal to provide a fluid flow magnitude signal.

In some embodiments, generating a first sensor signal having a fast first sensor signal rise time and generating a second sensor signal having a fast second sensor signal rise time includes generating the fast first sensor signal rise time approximately equal to the fast second sensor signal rise time where the step function change in the fluid flow is applied to the first sensor and the second sensor.

Figure 6:
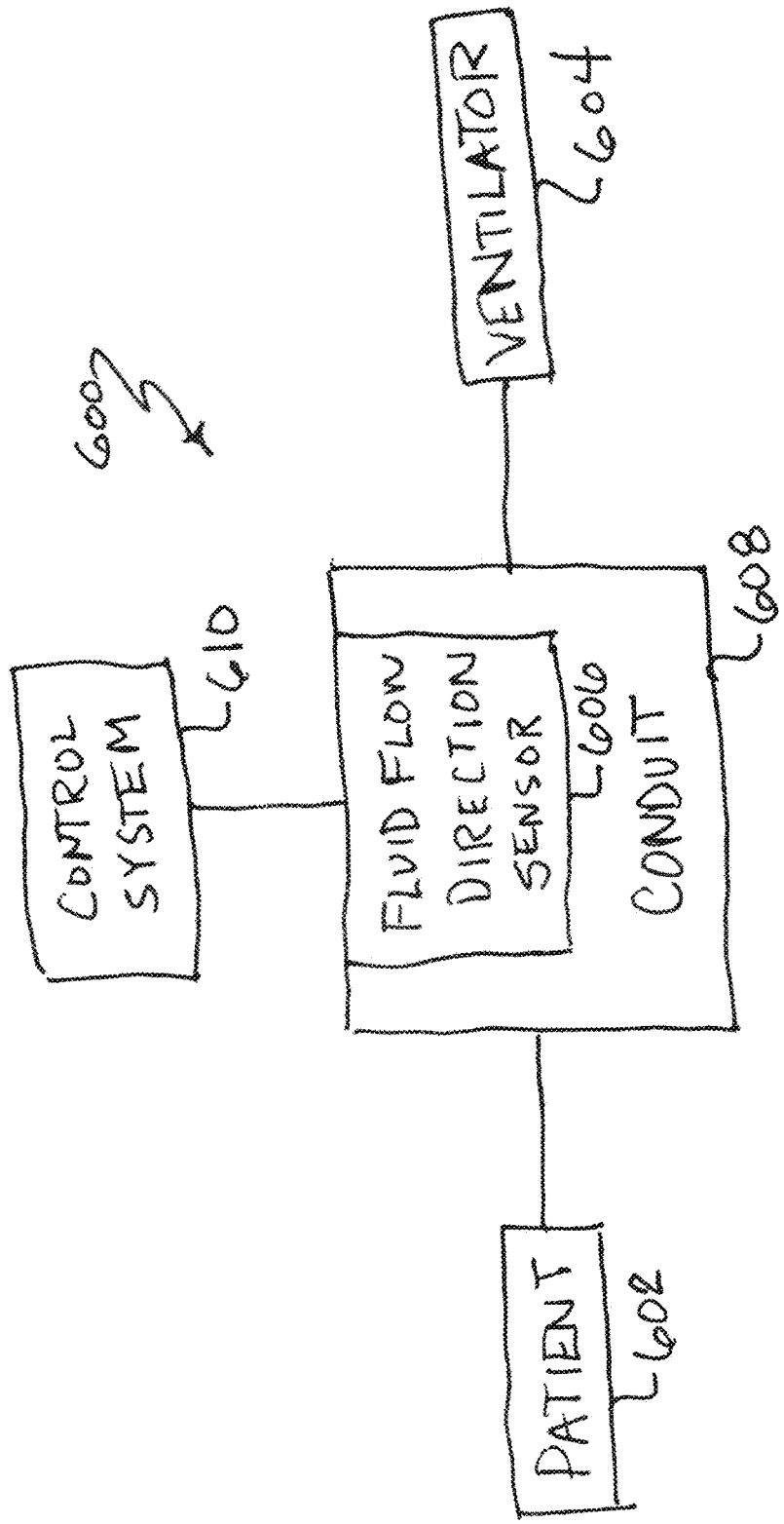
FIG. 6 shows a block diagram of a system to monitor a fluid flow direction in a fluid that flows between a patient and a ventilator in accordance with some embodiments of the present disclosure.

FIG. 6 shows a block diagram of a system 600 to monitor a fluid flow direction in a fluid that flows between a patient 602 and a ventilator 604. The system 600 includes a fluid flow direction sensor 606 having a barrier, such as the barrier 108 shown in FIG. 1. The fluid flow direction sensor 606 is coupled to a conduit 608. In operation, the conduit 606 is fluidically coupled to a patient 602 and a ventilator 604. In some embodiments, the system 600 includes a control system 610, such as an electronic control system, to couple to the fluid flow direction sensor 606 to monitor the flow direction. Exemplary sensors suitable for use in connection with the system 600 include the sensor shown in FIG. 1 and described above. In some embodiments, the conduit 608 has an hour glass shape with the fluid flow direction sensor 606 is located at the narrowest point of the conduit 608.

Figure 7:
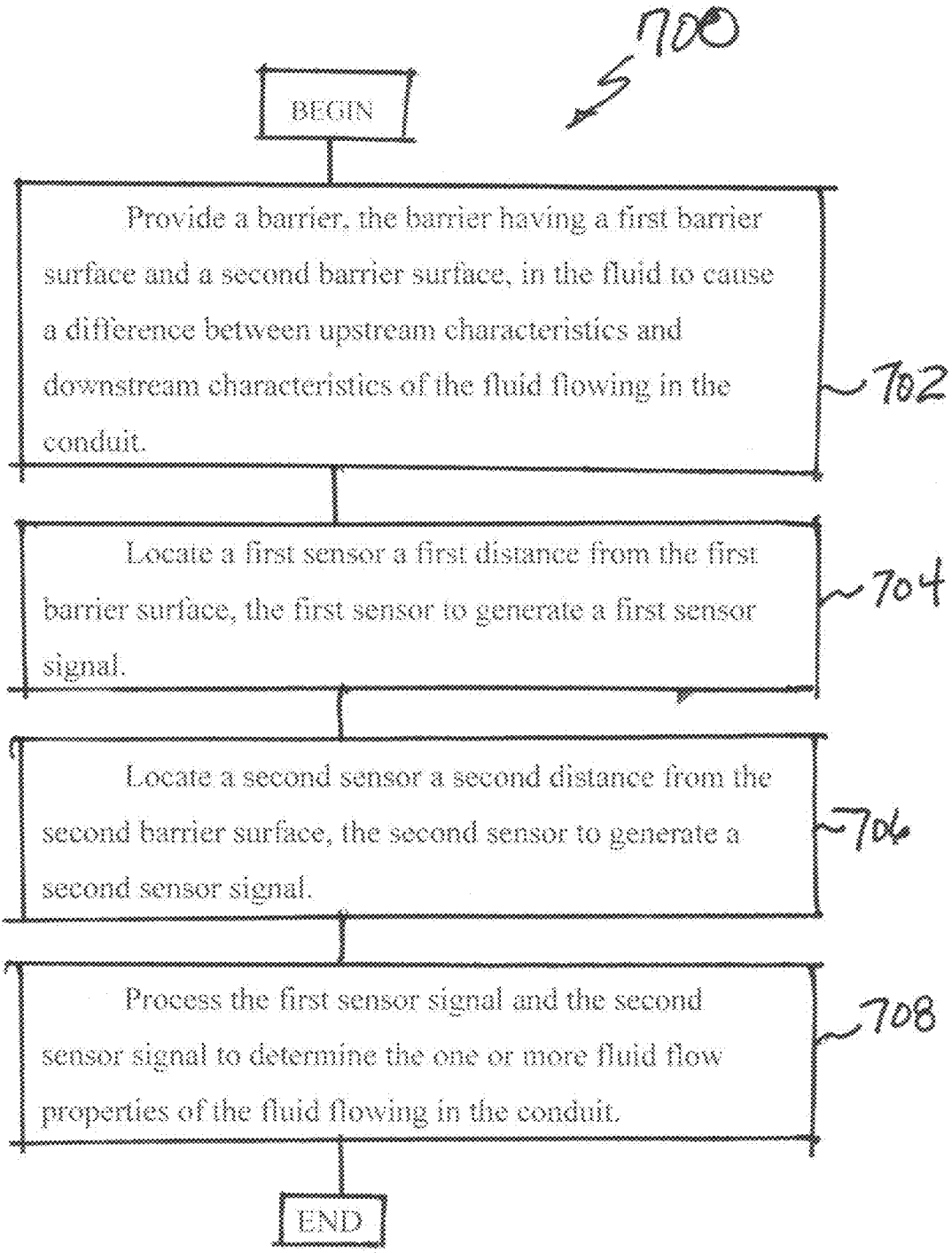
FIG. 7 shows a flow diagram of a method for determining one or more fluid flow properties of a fluid flowing in a conduit in accordance with some embodiments of the present disclosure.

FIG. 7 shows a flow diagram of a method 700 for determining one or more fluid flow properties of a fluid flowing in a conduit in accordance with some embodiments of the present disclosure. The method 700 includes providing a barrier, the barrier having a first barrier surface and a second barrier surface, in the fluid to cause a difference between upstream characteristics and downstream characteristics of the fluid flowing in the conduit (block 702), locating a first sensor a first distance from the first barrier surface, the first sensor to generate a first sensor signal (block 704), locating a second sensor a second distance from the second barrier surface, the second sensor to generate a second sensor signal (block 706), and processing the first sensor signal and the second sensor signal to determine the one or more fluid flow properties of the fluid flowing in the conduit (block 708).

Figure 8:
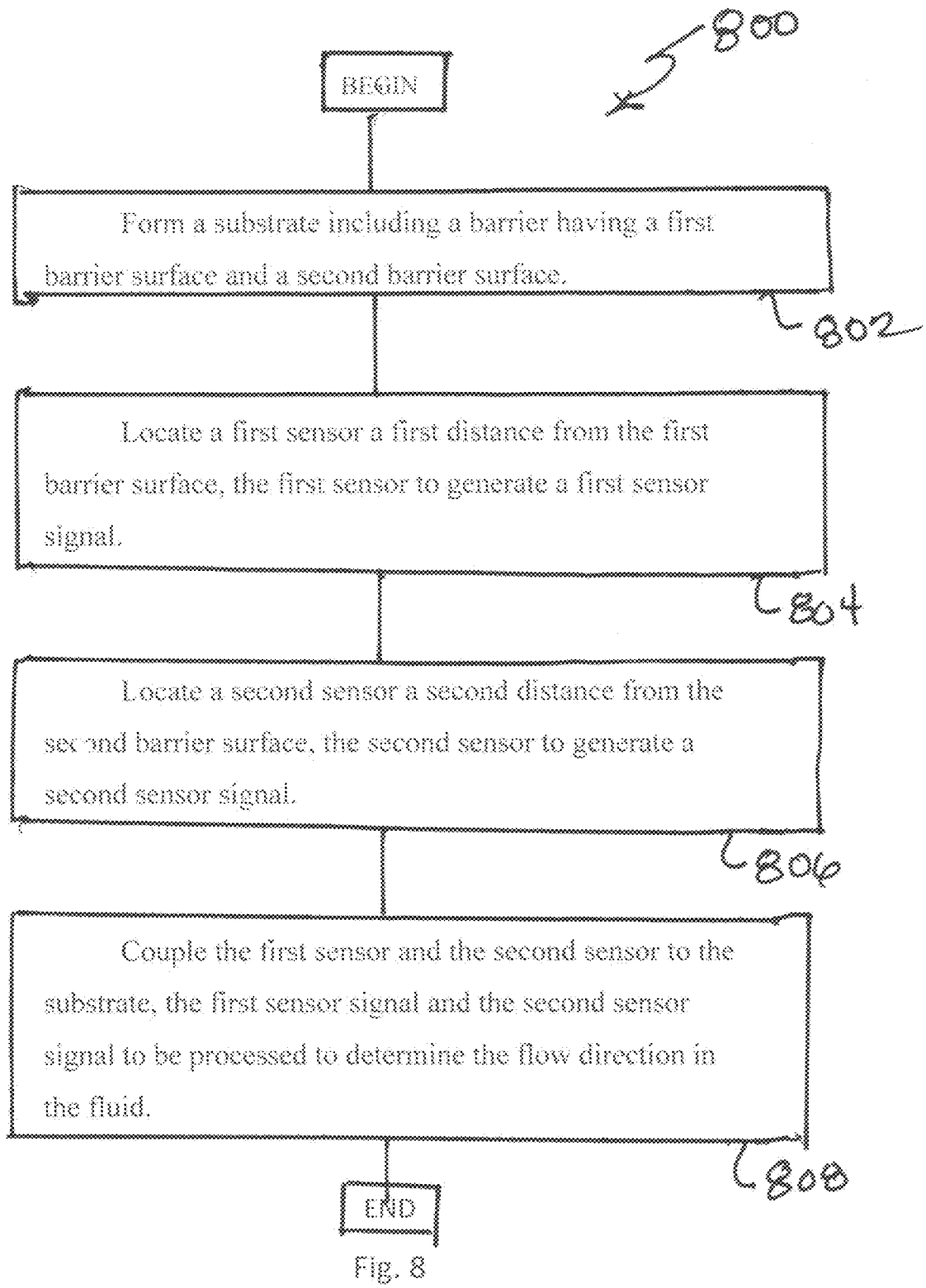
FIG. 8 shows a flow diagram of a method for making an apparatus to determine a flow direction in a fluid in accordance with some embodiments of the present disclosure.

FIG. 8 shows a flow diagram of a method 800 for making an apparatus to determine a flow direction in a fluid in accordance with some embodiments of the present disclosure. The method 800 includes forming a substrate including a barrier having a first barrier surface and a second barrier surface (block 802), locating a first sensor a first distance from the first barrier surface, the first sensor to generate a first sensor signal (block 804), locating a second sensor a second distance from the second barrier surface, the second sensor to generate a second sensor signal (block 806), and coupling the first sensor and the second sensor to the substrate, the first sensor signal and the second sensor signal to be processed to determine the flow direction in the fluid (block 808).

Reference throughout this specification to "an embodiment," "some embodiments," or "one embodiment." means that a particular feature, structure, material, or characteristic described in connection with the embodiment is included in at least one embodiment of the present disclosure. Thus, the appearances of the phrases such as "in some embodiments," "in one embodiment," or "in an embodiment," in various places throughout this specification are not necessarily referring to the same embodiment of the present disclosure. Furthermore, the particular features, structures, materials, or characteristics may be combined in any suitable manner in one or more embodiments.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. An apparatus for use in determining one or more fluid properties of a fluid flowing in a conduit, the apparatus comprising:
    a substrate including a barrier having a first barrier surface and a second barrier surface; a first flow sensor to generate a first velocity sensor signal, the first flow sensor located at a first sensor distance from the first barrier surface; and
    a second flow sensor to generate a second velocity sensor signal, the second flow sensor located at a second sensor distance from the second barrier surface, wherein the first sensor distance and the second sensor distance are selected to disturb the fluid flowing in the conduit in such a way as to enable determination of the one or more fluid flow properties from the first velocity sensor signal and the second velocity sensor signal.

2. The apparatus of claim 1, further comprising a third sensor including a pair of third sensor conductive pins, the pair of third sensor conductive pins embedded in the barrier and the substrate.

3. The apparatus of claim 2, wherein the first flow sensor includes a pair of first sensor conductive pins including a distance between the pair of first sensor conductive pins of between about 0.025 inches and about 0.035 inches.

4. The apparatus of claim 1, wherein the first flow sensor includes a thin-film flow sensor including a non-conductive fiber having a non-conductive fiber axis oriented substantially parallel to the first barrier surface.

5. The apparatus of claim 4, wherein the non-conductive fiber has a diameter of between about 0.070 and about 0.120 inches, the non-conductive fiber including a conductive film.

6. A method for making an apparatus to determine a flow direction in a fluid, the method comprising:
    forming a substrate including a barrier having a first barrier surface and a second barrier surface;
    locating a first flow sensor a first distance from the first barrier surface, the first flow sensor to generate a first sensor signal;
    locating a second flow sensor a second distance from the second barrier surface, the second flow sensor to generate a second sensor signal; and
    coupling the first flow sensor and the second flow sensor to the substrate, the first sensor signal and the second sensor signal to be processed to determine the flow direction in the fluid.

7. The method of claim 6, further comprising:
    aligning a third sensor substantially parallel to the first flow sensor and the second flow sensor, the third sensor including a pair of third sensor conductive pins; and
    embedding the pair of third sensor conductive pins in the substrate and the barrier.

8. The method of claim 6, wherein forming a substrate further comprises molding the substrate from a polycarbonate to form a unitary structure.

9. A method for determining one or more fluid flow properties of a fluid flowing in a conduit, the method comprising:
    providing a barrier, the barrier having a first barrier surface and a second barrier surface, in the fluid to cause a difference between upstream characteristics and downstream characteristics of the fluid flowing in the conduit;
    locating a first flow sensor a first distance from the first barrier surface, the first flow sensor to generate a first sensor signal;
    locating a second flow sensor a second distance from the second barrier surface, the second flow sensor to generate a second sensor signal; and
    processing the first sensor signal and the second sensor signal to determine the one or more fluid flow properties of the fluid flowing in the conduit.

10. The method of claim 9, wherein responding to a step function change in a fluid flow direction by generating a first sensor signal from a first flow sensor located in the fluid comprises generating the first sensor signal having a rise time of between about three milliseconds and about five milliseconds.

11. The method of claim 9, further comprising responding to the step function change in the fluid flow direction by generating a third sensor signal from a third sensor located in the fluid, the third sensor signal having a third sensor signal rise time of between about three milliseconds and about five milliseconds and the third sensor signal to provide a fluid flow magnitude signal.

12. A method for determining one or more fluid flow properties of a fluid flowing in a conduit, the method comprising:
    providing a barrier, the barrier having a first barrier surface and a second barrier surface, in the fluid to cause a difference between upstream characteristics and downstream characteristics of the fluid flowing in the conduit;

locating a first flow sensor a first distance from the first barrier surface, the first flow sensor to generate a first sensor signal;

locating a second flow sensor a second distance from the second barrier surface, the second flow sensor to generate a second sensor signal;

processing the first sensor signal and the second sensor signal to determine the one or more fluid flow properties of the fluid flowing in the conduit;

recording a sequential plurality of fluid flow sensor readings and a next fluid flow sensor reading following the sequential plurality of fluid flow sensor readings from the first flow sensor signal;

generating a curve from a least squares fit to the sequential plurality of fluid flow sensor readings;

generating a predicted next data point from the curve;

comparing the next fluid flow sensor reading to the predicted next data point and generating a difference between the next fluid flow sensor reading and the predicted next data point; and invalidating the next fluid flow sensor reading, if the difference is substantially greater than zero.

13. A system to monitor a fluid flow direction in a fluid that flows between a patient and ventilator, the system comprising:

a fluid flow direction sensor including a substrate including a barrier having a first barrier surface and a second barrier surface, the fluid flow direction sensor to detect the fluid flow direction in the fluid;

a first flow sensor to generate a first velocity sensor signal, the first flow sensor located at a first sensor distance from the first barrier surface; and a second flow sensor to generate a second velocity sensor signal, the second flow sensor located at a second sensor distance from the second barrier surface, wherein the first sensor distance and the second sensor distance are selected to disturb the fluid flowing in the conduit in such a way as to enable determination of the one or more fluid flow properties from the first velocity sensor signal and the second velocity sensor signal; and a conduit coupled to the fluid flow direction sensor, the conduit to couple to the patient and the ventilator.

14. The system of claim 13, further comprising a control system to couple to the fluid flow direction sensor to monitor the fluid flow direction.

15. A system to monitor a fluid flow direction in a fluid that flows between a patient and ventilator, the system comprising:

a fluid flow direction sensor including a barrier, the fluid flow direction sensor to detect the fluid flow direction in the fluid;

a conduit coupled to the fluid flow direction sensor, the conduit to couple to the patient and the ventilator; and a control system to couple to the fluid flow direction sensor to monitor the fluid flow direction; and wherein the fluid flow direction sensor incudes a first sensor and a second sensor separated by the barrier.

* * * * *